United States Patent [19]

Hartwig

[11] Patent Number: 4,546,282

[45] Date of Patent: Oct. 8, 1985

[54] MAGNETIZABLE CORE FOR ACCOMMODATING ELECTRICAL CONDUCTORS IN AN ELECTRICAL MACHINE, AND A METHOD OF MANUFACTURING SUCH A CORE

[75] Inventor: Carl S. M. Hartwig, Täby, Sweden

[73] Assignee: Institut Cerac S.A., Ecublens, Switzerland

[21] Appl. No.: 655,351

[22] Filed: Sep. 27, 1984

Related U.S. Application Data

[63] Continuation of Ser. No. 499,979, Jun. 1, 1983, abandoned.

[30] Foreign Application Priority Data

Jun. 29, 1982 [CH] Switzerland ............... 3970/82

[51] Int. Cl.[4] .......................................... H02K 1/18
[52] U.S. Cl. ................................ 310/218; 310/258
[58] Field of Search ............... 310/216, 217, 218, 257, 310/258

[56] References Cited

U.S. PATENT DOCUMENTS 3,983,433  9/1976  Sims ..................... 310/216
3,983,435  9/1976  Sims ..................... 310/216

Primary Examiner—Peter S. Wong
Assistant Examiner—Anita M. Ault
Attorney, Agent, or Firm—Sughrue, Mion, Zinn, Macpeak and Seas

[57] ABSTRACT

A core for a stator and/or rotor of an electrical machine comprises at least one strip of magnetizable material which has been bent in an undulating fashion, to define tooth-like projections (1, 2) and grooves (3, 4, 5) lying therebetween, for accommodating electrical conductors. The thus bent or folded strip is bent to form a circular ring.

5 Claims, 8 Drawing Figures

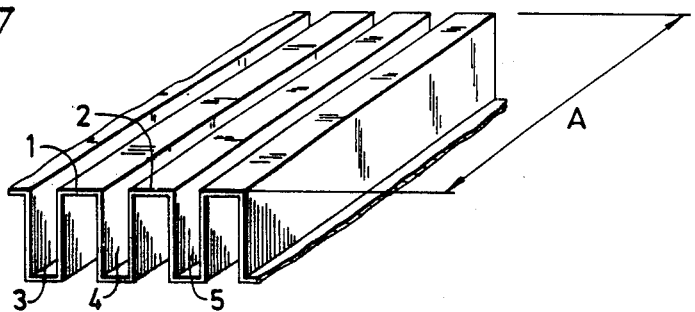
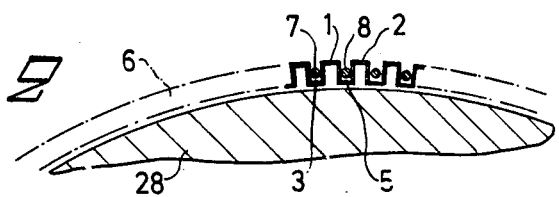
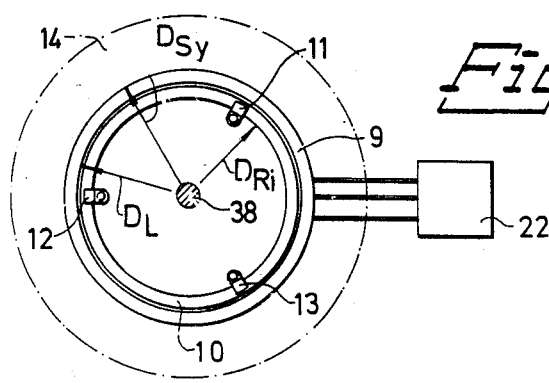
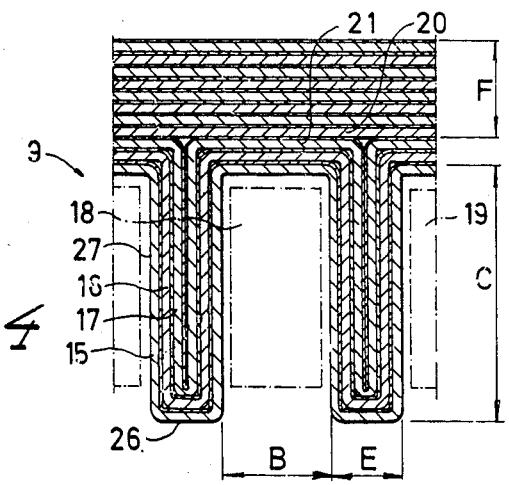

MAGNETIZABLE CORE FOR ACCOMMODATING ELECTRICAL CONDUCTORS IN AN ELECTRICAL MACHINE, AND A METHOD OF MANUFACTURING SUCH A CORE

This is a continuation of application Ser. No. 499,979 filed June 1, 1983, now abandoned.

The invention relates to a magnetisable core for accommodating electrical conductors in an electric machine, such as an electric motor or an electric generator, said core being provided on one surface thereof with tooth-like projections and intermediate grooves for accommodating said conductors. The invention also relates to a method for manufacturing such a core.

Such a core, which is incorporated in the rotor and-/or stator of an electric motor or electric generator, normally comprises a large number of planar plates made of a magnetisable material and pressed together to form a package in which the outer surfaces or planes of the plates extend at right angles to the axis of rotation of the machine. The plate surfaces are coated with a thin, electrical insulating layer of varnish, or are provided with an insulating layer of paper.

Rotors, for example, are manufactured by punching from sheets of magnetisable material large numbers of mutually identical, circular rotor plates having tooth-like projections and intermediate grooves for accommodating electrical conductors in the form for example, of aluminium rods or copper rods, or coil hanks, whereafter the rotor plates are placed together to form a complete rotor core. One disadvantage with this method of manufacture is that large amounts of expensive magnetisable metal-sheet material goes to waste when punching the plates from said material. In certain instances, the amount of material wasted can be greater than the amount utilized in the manufactured cores. A further problem is that when manufacturing cores in small numbers, the costs of the punching tools are very high, naturally resulting in a high price for the finished motor or generator.

Consequently, a prime object of the present invention is to provide a core which is manufactured with a negligible amount of waste and which is extremely inexpensive, irrespective of the number of cores of given dimensions manufactured.

This object is achieved in accordance with the invention, substantially in that the core comprises at least one strip of magnetisable material which is bent or folded in an undulating fashion to define said tooth-like projections and grooves, and which is bent to form a circular ring.

According to the invention, a plurality of strips bent in said undulating fashion can be placed one upon the other, with the teeth of respective strips projecting into each other, so that a larger quantity of magnetisable material is present. The amount of magnetisable material present can be further increased by pressing a ring comprising one or more turns of magnetisable strip material into the bottoms of the grooves.

The invention will now be described in more detail with reference to the accompanying drawings, in which FIG. 1 illustrates a section of bent or folded metal strip for manufacturing a core in accordance with the invention;

FIG. 2 illustrates part of the cylindrical surface of a rotor provided with a core according to the invention;

FIG. 3 illustrates schematically the construction of an induction motor according to the invention, with radial magnetic flux;

FIG. 4 illustrates a detail of the stator of the motor shown in FIG. 3;

Figure 5:
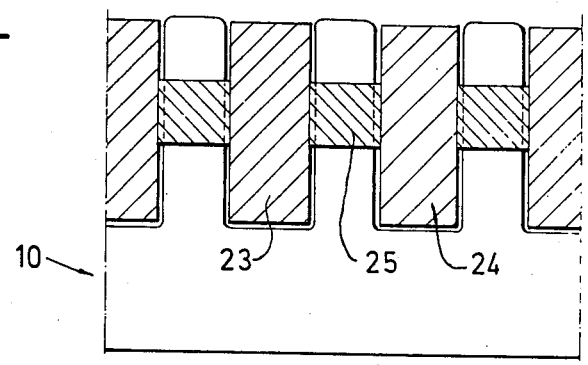
FIG. 5 illustrates a part of the rotor shown in FIG. 3.

FIG. 1 illustrates in perspective a section of an originally flat strip of magnetisable material, preferably a material of the kind normally used for manufacturing cores of electrical motor, electrical generators and transformers. It is also possible, however, to use soft-iron sheet or like material, if the efficiency of the machine is ignored. As will be seen from FIG. 1, the initially planar sheet-metal strip has been bent or folded to form undulations, so as to obtain tooth-like projections 1, 2 which define respective adjacent grooves 3, 4, 5. Each groove 3, 4, 5 is arranged to accommodate an electrical conductor or part of a coil hank, while the tooth-like projections 1, 2 form poles in the normal way. The folded or bent strip, of which a section is shown in FIG. 1, is clipped to the desired length and then bent around a cylindrical mandral 28, indicated in FIG. 2, whereafter the mutually opposing ends of the strip are joined together by welding, glueing or by some other suitable means.

FIG. 2 illustrates in a simplified manner part of a cylindrical rotor 6 produced from a single, bent sheet-metal strip according to FIG. 1. A sheet-metal strip according to FIG. 1 of intended length, i.e. a length which is equal to $\pi \cdot D$, where D is the diameter of the rotor, has been clipped and bent to form a circular, drum-like core, in which electrical conductors, for example the conductors 7 and 8, are placed in the grooves 3 and 5. These conductors may comprise a coil hank or solid rods, the ends of which are short-circuited via a ring. In the illustrated embodiment, the strip illustrated in FIG. 1 has been bent around a centre which, in the Figure, lies beneath the strip. If a stator is to be manufactured, i.e. the core is to be provided with electrical conductors on the inner surface of the circular core, the strip shown in FIG. 1 is bent around a centre which, in the Figure, lies above the strip. It should be noted that the bent sheet-metal strip from which a stator is to be produced normally has different dimensions to a sheet-metal strip from which a rotor is to be manufactured, due to, for example, the different pole pitch for stator and rotor.

FIG. 3 is a particularly simplified view of a 3-phase motor provided with cores contructed in accordance with the invention, while FIGS. 4 and 5 illustrate details of the stator 9 and the rotor 10 respectively. The stator 9 is stationarily mounted in a manner not specifically shown, and the rotor 10 is fixedly attached by means of clamping means 11, 12 and 13 to the device 14 to be driven around its shaft 38, said shaft being rotatably journalled in bearing means (not shown). As an example of a device to be driven by the motor can be mentioned the rotatable drum of washing machines, and in this respect the reference 14 thus identifies the cylindrical end wall of the drum.

It is assumed hereinafter that the motor is intended to drive a washing machine, the drum 14 of which can be rotated at different speeds and its direction of movement reversed. If the washing machine is intended to take a load of from 6 to 8 kg of washing, it is suitable to take as a suitable point of departure, a 3-phase motor having a maximum torque of about 35 Nm at all speeds. This torque corresponds to an approximate power of 3500 W at a speed of 1000 r.p.m. If it is desired to produce as thin a motor as possible and the strip-width A (FIG. 1) is chosen as 25 mm and the gauge of the strip as 0.5 mm (conventional sheet-metal strip for cores) the following principle data for the motor is obtained.

Stator outer diameter, $D_{sy} = \sim 332$ mm
Air gap diameter, $D_L = \sim 300$ mm
Rotor inner diameter, $D_{Ri} = \sim 274$ mm
Pole number 50
Groove number 1 (1 groove per pole and phase)

The width of the air gap has been ignored here, but should not be smaller than 0.6 mm.

The stator is provided with 150 grooves each having a width B (FIG. 4) of 3.7 mm and a depth C of 10 mm, and 150 teeth having a width E of 3.6 mm. In the illustrated example, the rotor 10 is provided with 165 grooves and tooth-like projections having a tooth width E of 3 mm, a groove width B of 3.7 mm and a groove depth C of 8 mm. In order to obtain the torque required, the stator is constructed in the manner shown in detail in FIG. 4. Pressed into a first, undulated strip 15 of the kind illustrated in FIG. 1, is a second undulated strip 16, the outer dimensions of which are adapted to the inner dimensions of the tooth-like projections in the strip 15 and to the outer dimensions of the groove in strip 1. Pressed into, or fitted into the strip 16 is a third, undulated strip 17, and when viewed practically the tooth-like projections of the stator 9 can be considered as comprising a homogeneous magnetic material. When each tooth-like projection must be built-up so as to become practically homogeneous, the number of folded or bent strips fitting one within the other will naturally vary in dependence on the tooth-like projection width E and the thickness of the metal sheet. In FIG. 4 there is shown between strips 15, 16 and 16, 17 respectively gaps which mark insulating layers of varnish, paper or like insulating material. In order to obtain the greatest possible amount of iron in each tooth, the tooth-like projections are provided with such a width on each tooth on the mutually nestling strips 15, 16, 17 as to obtain close abutment between the inner surface of an outer tooth and the outer surface of a next-following tooth Preferably, there are used so many strips that the innermost tooth, which in the FIG. 4 embodiment is formed by the strip 17, has an inner interspace or a gap which is solely defined by the thickness of the insulation, as illustrated in FIG. 4. The stator conductors or hank conductors 18 and 19 indicated in FIG. 4 can be placed in position prior to bending the undulating strips 15, 16, 17 into cylinder form of circular cross-section, although said conductors can naturally be placed in position after bending said strips to form said cylinder. It is preferred, however, to place the conductors or hanks into position prior to bending said strips into said cylindrical shape, since the grooves close slightly during bending of the strips, thereby to firmly clamp the conductors or hanks. Subsequent to bending the sheet-metal strips to a cylindrical shape, for example around a cylindrical mandrel 28, a strip 20 is wound around the outside of the undulating strips, so that said strip closely abuts the outer groove bottom 21. In the illustrated embodiment, the strip 20 has been wound eight turns.

There is thus obtained a substantially homogenous ring having a height F of about 6 mm calculated from the bottom of respective grooves to the outer surface of the planar strip 20 wound thereon. The width of the strip 20 is suitably the same as the width of the bent or folded strips 15-17. If the free, outer end of the strip 20 is not welded or bonded to the underlying strip turn, the whole of the stator 9 can be pressed into a cylindrical holder or like device, which may be incorporated, for example, in a frame structure in the machine in which the motor is to be installed.

The rotor 10, of which a detail is illustrated in FIG. 5, is constructed in the present embodiment in a manner corresponding to the stator in FIG. 4, with three bent or folded strips and an inner, planar strip wound through several turns. This planar strip, which also has the same width as the undulating strips in the rotor and stator, is, in the illustrated case, only wound seven turns, and the distance between the groove bottom and the inner diameter of the rotor is about 5 mm. A motor having the aforementioned dimensions obtains a linear current density of about 20000A/m at maximum torque and a maximum magnetic flux density in the air gap, $B_{med}$, of about 0.6T.

FIG. 5 illustrates a short-circuited rotor 10 having pressed in the grooves thereof, in a manner known per se, aluminium conductors, for example the conductors 23 and 24, the ends of which are conductively connected to each other by means of a short-circuiting ring 25 on both ends of the rotor. The short-circuiting rings are pressed onto said ends at the same time as the conductors 23 and 24 are pressed into said grooves.

To enable the motor to be controlled independence on load at the intended speed, there is suitably used a control means 22 (FIG. 3) of the kind described in Swiss Patent Application No. 8097/81.

A core of the kind described can be used for any kind of electric motor or generator whatsoever having a stator and/or rotor provided with pole-forming tooth-like projections, for example a d.c. motor, an ascronous generator and asyncronous motor, in addition to the aforedescribed short-circuited induction motor.

To avoid cracking at the fold or bend edges of a strip, for example the strip 15, the junction between two mutually connecting sides, for example the sides 26 and 27 (FIG. 4) is suitably formed gently, i.e. so as not to be abrupt. In the aforegoing it has been assumed that the bent or folded strip surfaces pairwise form right angles with each other, although, as will be understood, it is possible in certain cases to bend or fold the strip so that, prior to bending said strip to form a cylinder, the grooves have a frusto-conical cross-sectional shape, which changes to a rectangular shape when the strip is bent to said circular form.

Although the aforegoing description has been made with reference to the radial flux motor, it will be understood that the invention can also be applied in the manufacture of a stator and/or rotor for an axial-flux machine, i.e. a machine in which the magnetic flux extends in the direction of the axis of rotation.

Figure 6:
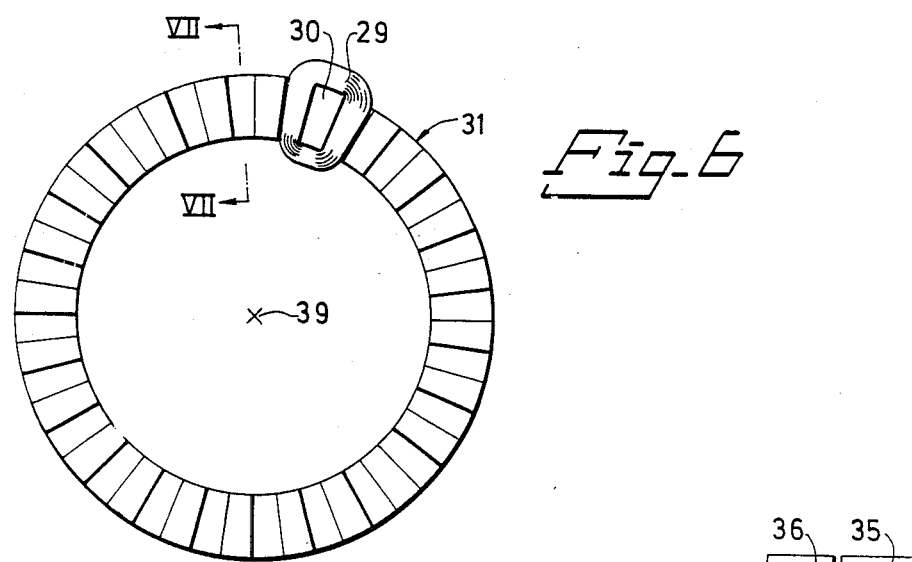
FIG. 6 illustrates schematically a stator according to the invention for a machine with axial magnetic flux.
Figure 7:
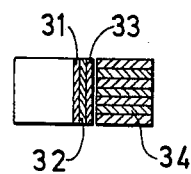
FIG. 7 is a sectional view taken on the line VII—VII in FIG. 6.

FIG. 6 is a simplified view of this kind of stator, in which one or more undulating strips are bent in a circle around the centre of rotation 39 of the machine. FIG. 6 illustrates a conductor hank 29 arranged in two mutually adjacent grooves with an intermediate tooth 30, in a strip 31. As shown in the sectional view of FIG. 7, three undulating, folded strips 31, 32 and 33 have been used, and that these strips are arranged in the manner described with reference to FIG. 4. A planar strip 34 is wound spirally to form a ring and, as evident from FIG. 7, the number of turns in the ring of the illustrated embodiment is such that said ring obtains the same width as the strips 31–33 of mutually equal width.

The ring formed from the strip 34 and manufactured from a suitable magnetisable material is secured to the ring comprising said undulating, folded strips in a manner not shown, for example by means of bolts passing through said undulating strips and said ring, the grooves and tooth-like projections of said ring lying in a plane extending at right angles to the axis 37.

Figure 8:
FIG. 8 is a simplified view of a stator shown in FIG. 6, with a co-acting rotor.

FIG. 8 is a simplified view of an axial magnetic flux machine, comprising a disc-like stator 35 according to FIG. 6 and a disc-like rotor 36 having an output shaft 37.

I claim:

1. A magnetisable circular core for an electrical machine, such as electrical motor or an electrical generator, said circular core having on one surface thereof tooth-like projections (1, 2) and intermediate grooves (3, 4, 5) for accomodating electrical conductors (7, 8), the improvement wherein said circular core comprises a plurality of bent or folded strips (15, 16, 17; 31, 32, 33) arranged one tightly upon the other with tooth-like projections of respective strips extending one into the other to form substantially homogeneous magnetic poles, and wherein said plurality of bent or folded strips form a circular ring, and wherein said tooth-like projections are respective widths for mutually nestling strips so as to obtain close abutment between the inner surface of the tooth-like projections for an outer nestling strip and the outer surface of the tooth-like projections of the next following nestling strip, thereby eliminating free space in the poles formed by the tooth-like projections of the nested strips.

2. A core according to claim 1, characterized in that the tooth-like projections of respective strips are so formed that the free space in respective tooth-like projections is substantially filled with magnetisable strip material.

3. A core according to claim 1 or 2, characterized in that connected to the ring comprising one or more bent or folded strips is a ring which comprises at least one planar strip (20; 34) and which abuts the bottoms(21) of said grooves.

4. A core according to claim 1, characterized in that the undulating strips (15, 16, 17) is bent to form a cylinder having tooth-like projections and grooves located on the cylindrical surface thereof.

5. A core according to claim 1, characterized in that the undulating strip (31, 32, 33) is bent to form a flat ring with the tooth-like projections and grooves substantially axial relative to the axis of rotation (28) of the machine.

* * * * *